(12) United States Patent
Sakai (10) Patent No.: US 12,118,346 B2
(45) Date of Patent: *Oct. 15, 2024

(54) CENTER, MANAGEMENT METHOD, AND NON-TRANSITORY STORAGE MEDIUM

(71) Applicant: TOYOTA JIDOSHA KABUSHIKI KAISHA, Toyota (JP)

(72) Inventor: Yoshikazu Sakai, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,092

(22) Filed: Nov. 6, 2023

(65) Prior Publication Data

US 2024/0069903 A1 Feb. 29, 2024

Related U.S. Application Data

(63) Continuation of application No. 17/528,770, filed on Nov. 17, 2021, now Pat. No. 11,847,439.

(30) Foreign Application Priority Data

Jan. 14, 2021 (JP) ................. 2021-004358

(51) Int. Cl.
*G06F 9/44* (2018.01)
*G06F 8/65* (2018.01)
(Continued)

(52) U.S. Cl.
CPC .............. *G06F 8/65* (2013.01); *G06F 8/71* (2013.01); *H04L 67/34* (2013.01)

(58) Field of Classification Search
CPC ............................................. G06F 8/65
(Continued)

(56) References Cited

U.S. PATENT DOCUMENTS 8,813,061 B2 8/2014 Hoffman et al.
9,639,344 B2 5/2017 Rockwell et al.
(Continued)

FOREIGN PATENT DOCUMENTS

CN 114647424 A 6/2022
DE 102007010763 A1 9/2008
(Continued)

OTHER PUBLICATIONS

U.S. Appl. No. 16/279,290, filed Feb. 19, 2019 in the name of Masaki Miyake et al.
(Continued)

*Primary Examiner* — Evral E Bodden
(74) *Attorney, Agent, or Firm* — Oliff PLC (57) ABSTRACT

A center configured to communicate with an OTA master configured to control software updating of a plurality of electronic control units installed in a vehicle includes: a communication device configured to receive, from the OTA master, identification information; a storage device storing propriety determination information used in propriety determination of determining whether the version of software implemented in each of the electronic control units is an implementation management version; and a processor configured to perform the propriety determination based on the identification information and the propriety determination information, and perform, by communicating with the OTA master, restoration control on at least one of the electronic control units regarding which a determination has been made that the version of the software is not the implementation management version.

5 Claims, 7 Drawing Sheets

(51) Int. Cl.
*G06F 8/71* (2018.01)
*H04L 67/00* (2022.01)

(58) Field of Classification Search
USPC .......................................................... 717/172
See application file for complete search history.

(56) References Cited

U.S. PATENT DOCUMENTS

| | | |
|---|---|---|
| 2008/0221752 A1 | 9/2008 | Jager et al. |
| 2009/0161143 A1 | 6/2009 | Nakamoto |
| 2011/0112718 A1 | 5/2011 | Claus et al. |
| 2014/0344799 A1* | 11/2014 | Thodati ............... G06F 8/65 717/171 |
| 2015/0169311 A1 | 6/2015 | Dickerson et al. |
| 2017/0286099 A1 | 10/2017 | Wilkinson |
| 2019/0057214 A1 | 2/2019 | Xia et al. |
| 2019/0278582 A1 | 9/2019 | Miyake et al. |
| 2019/0324858 A1 | 10/2019 | Sarkar et al. |
| 2020/0174779 A1 | 6/2020 | David et al. |
| 2020/0352083 A1 | 11/2020 | Ramachandran et al. |
| 2021/0157571 A1 | 5/2021 | Ogawa et al. |
| 2021/0311721 A1 | 10/2021 | Miyake et al. |
| 2022/0148344 A1* | 5/2022 | Teraoka ............... G09C 1/00 |

FOREIGN PATENT DOCUMENTS

| | | |
|---|---|---|
| DE | 102008024979 A1 | 11/2009 |
| DE | 102019109672 A1 | 10/2019 |
| EP | 3779677 A1 | 2/2021 |
| JP | 2004-326689 A | 11/2004 |
| JP | 2009-146119 A | 7/2009 |
| JP | 2020-124223 A | 8/2020 |
| WO | 2020/011678 A1 | 1/2020 |
| WO | 2020/032202 A1 | 2/2020 |

OTHER PUBLICATIONS

U.S. Appl. No. 17/347,897, filed Jun. 15, 2021 in the name of Masaki Miyake et al.
Feb. 3, 2023 Office Action issued In U.S. Appl. No. 17/528,770.
Aug. 9, 2023 Notice of Allowance issued in U.S. Appl. No. 17/528,770.

* cited by examiner

| VIN | NO. | ECU1 | ECU2 | ECU3 | ECU4 |
|---|---|---|---|---|---|
| 1001 | 1 | 1.0 | 1.0 | 1.0 | 1.0 |
| | 2 | 1.1 | 1.0 | 1.0 | 1.0 |
| | 3 | 1.0 | 1.1 | 1.0 | 1.0 |
| | ⋮ | ⋮ | ⋮ | ⋮ | ⋮ |
| | 15 | 2.0 | 2.0 | 2.0 | 2.0 |
| | 16 | 2.1 | 2.0 | 2.0 | 2.0 |
| | 17 | 2.0 | 2.1 | 2.0 | 2.0 |
| | ⋮ | ⋮ | ⋮ | ⋮ | ⋮ |
| | 25 | 2.2 | 2.4 | 2.2 | 2.5 |
| | ⋮ | ⋮ | ⋮ | ⋮ | ⋮ |
| | 36 | 2.2 | 2.5 | 2.3 | 2.5 |
| | ⋮ | ⋮ | ⋮ | ⋮ | ⋮ |

FIG. 9

| VIN | HISTORY NO. | IMPLEMENTATION MANAGEMENT VERSION | CONFORMITY DETERMINATION | ECU1 | ECU2 | ECU3 | ECU4 |
|---|---|---|---|---|---|---|---|
| 1001 | 1 | | ○ | 1.2 | 2.1 | 1.5 | 1.0 |
| | 2 | | ○ | 1.3 | 2.1 | 1.5 | 1.1 |
| | ⋮ | | ⋮ | ⋮ | ⋮ | ⋮ | ⋮ |
| | 10 | | ○ | 2.1 | 2.4 | 2.2 | 2.4 |
| | 11 | ○ | ○ | 2.2 | 2.4 | 2.2 | 2.5 |
| | 12 | | × | 2.2 | 2.5 | 1.5 | 2.5 |
| | ⋮ | | | | | | |

*THICK LINE CELLS PORTION WHERE SW VERSION IS INAPPROPRIATELY CHANGED

FIG. 10

| VIN | HISTORY NO. | IMPLEMENTATION MANAGEMENT VERSION | CONFORMITY DETERMINATION | ECU1 | ECU2 | ECU3 | ECU4 |
|---|---|---|---|---|---|---|---|
| 1001 | 1 | | ○ | 1.2 | 2.1 | 1.5 | 1.0 |
| | 2 | | ○ | 1.3 | 2.1 | 1.5 | 1.1 |
| | ⋮ | | ⋮ | ⋮ | ⋮ | ⋮ | ⋮ |
| | 10 | | ○ | 2.1 | 2.4 | 2.2 | 2.4 |
| | 11 | ○ | ○ | 2.2 | 2.4 | 2.2 | 2.5 |
| | 12 | | ○ | 2.2 | 2.5 | 2.3 | 2.5 |
| | ⋮ | | | | | | |

*THICK LINE CELLS PORTION WHERE SW VERSION IS INAPPROPRIATELY CHANGED

CENTER, MANAGEMENT METHOD, AND NON-TRANSITORY STORAGE MEDIUM

CROSS-REFERENCE TO RELATED APPLICATIONS

This is a continuation of U.S. patent application Ser. No. 17/528,770 filed Nov. 17, 2021 (now U.S. Pat. No. 11,847, 439), which claims priority to Japanese Patent Application No. 2021-004358 filed on Jan. 14, 2021. The disclosure of each of the above-identified prior applications is incorporated herein by reference in its entirety.

BACKGROUND

1. Technical Field

The present disclosure relates to a center, a management method, and a non-transitory storage medium.

2. Description of Related Art

A plurality of electronic control units (ECUs) installed in vehicles, for controlling operations of the vehicle. An ECU is provided with a processor, a transitory storage unit such as random access memory (RAM), and a nonvolatile storage unit such as flash read-only memory (ROM), with the processor executing software stored in the nonvolatile storage unit, thereby realizing control functions of the ECU. The software stored in each ECU is rewritable, and updating to a newer version of the software enables the functions of the ECUs to be improved, new vehicle control functions to be added, and so forth.

Over-the-air (OTA) technology is known as a technology for updating software of ECUs. In OTA, in-vehicle communication equipment connected to an in-vehicle network and a communication network such as the Internet or the like are wirelessly connected, software is downloaded from an OTA center (may be referred to simply as "center") via wireless communication, and the downloaded software is installed, thereby performing updating or adding of ECU programs (see Japanese Unexamined Patent Application Publication No. 2004-326689 (JP 2004-326689 A), for example).

Following registration of a campaign that is an event for performing updating of software in a server, software updating by OTA is performed triggered by the vehicle requesting confirmation of whether there is update data in the OTA center. When there is a campaign, the vehicle sequentially performs downloading of the update data, installation of the update data, and activation of the updated version of software, thereby updating the software of a target ECU that is an update object ECU.

SUMMARY

When an ECU of a vehicle is replaced (parts replacement), the version of the software implemented in the ECU following replacement may be different from the version of the software implemented in the ECU prior to replacement. In combinations of versions of software of a plurality of ECUs installed in the vehicle, there are cases in which combinations exist regarding which there is a possibility that the vehicle will not operate properly (non-conforming version combinations), and when an ECU is replaced and the combination of versions is non-conforming, the issue needs to be addressed.

The present disclosure provides a center, a management method, and a non-transitory storage medium, by which versions of software implemented in an ECU before and following replacement of the ECU can be made to be the same.

A center according to a first aspect of the present disclosure is configured to communicate, via a network, with an over-the-air (OTA) master configured to control software updating of a plurality of electronic control units installed in a vehicle. The center includes: a communication device configured to receive, from the OTA master, identification information indicating a version of software implemented in each of the electronic control units; a storage device that stores propriety determination information used in propriety determination of determining whether the version of software implemented in each of the electronic control units is an implementation management version that is a version of software to be implemented; and a processor configured to perform the propriety determination based on the identification information and the propriety determination information, and perform, by communicating with the OTA master, restoration control on at least one of the electronic control units regarding which the processor has made a determination that the version of the software is not the implementation management version, the restoration control being control for returning the version of the software to the implementation management version.

A management method according to a second aspect of the present disclosure is executed by a computer including a processor, memory, and a communication device configured to communicate, via a network, with an over-the-air (OTA) master configured to control software updating of a plurality of electronic control units installed in a vehicle. The management method includes: receiving, from the OTA master, identification information indicating a version of software implemented in each of the electronic control units; storing propriety determination information used in propriety determination of determining whether the version of the software implemented in each of the electronic control units is an implementation management version that is a version of software to be implemented; performing the propriety determination based on the identification information and the propriety determination information; and performing, by communicating with the OTA master, restoration control on at least one of the electronic control units, regarding which determination has been made in the propriety determination that the version of the software is not the implementation management version, the restoration control being control for returning the version of the software to the implementation management version.

A management program according to a third aspect of the present disclosure stores a management program that is executable by a computer including a processor, memory, and a communication device that is communicable, via a network, with an over-the-air (OTA) master that controls software updating of a plurality of electronic control units installed in a vehicle, and that causes the computer to perform functions including: receiving, from the OTA master, identification information indicating a version of software implemented in each of the electronic control units; storing propriety determination information used in propriety determination of determining whether the version of the software implemented in each of the electronic control units is an implementation management version that is a version of software to be implemented; performing the propriety determination based on the identification information and the propriety determination information; and performing, by communicating with the OTA master, restoration control on at least one of the electronic control units, regarding which determination has been made in the propriety determination that the version of the software is not the implementation management version, the restoration control being control for returning the version of the software to the implementation management version.

According to the present disclosure, a center, a management method, and a non-transitory storage medium, by which versions of software implemented in an ECU before and following replacement of the ECU can be made to be the same, can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
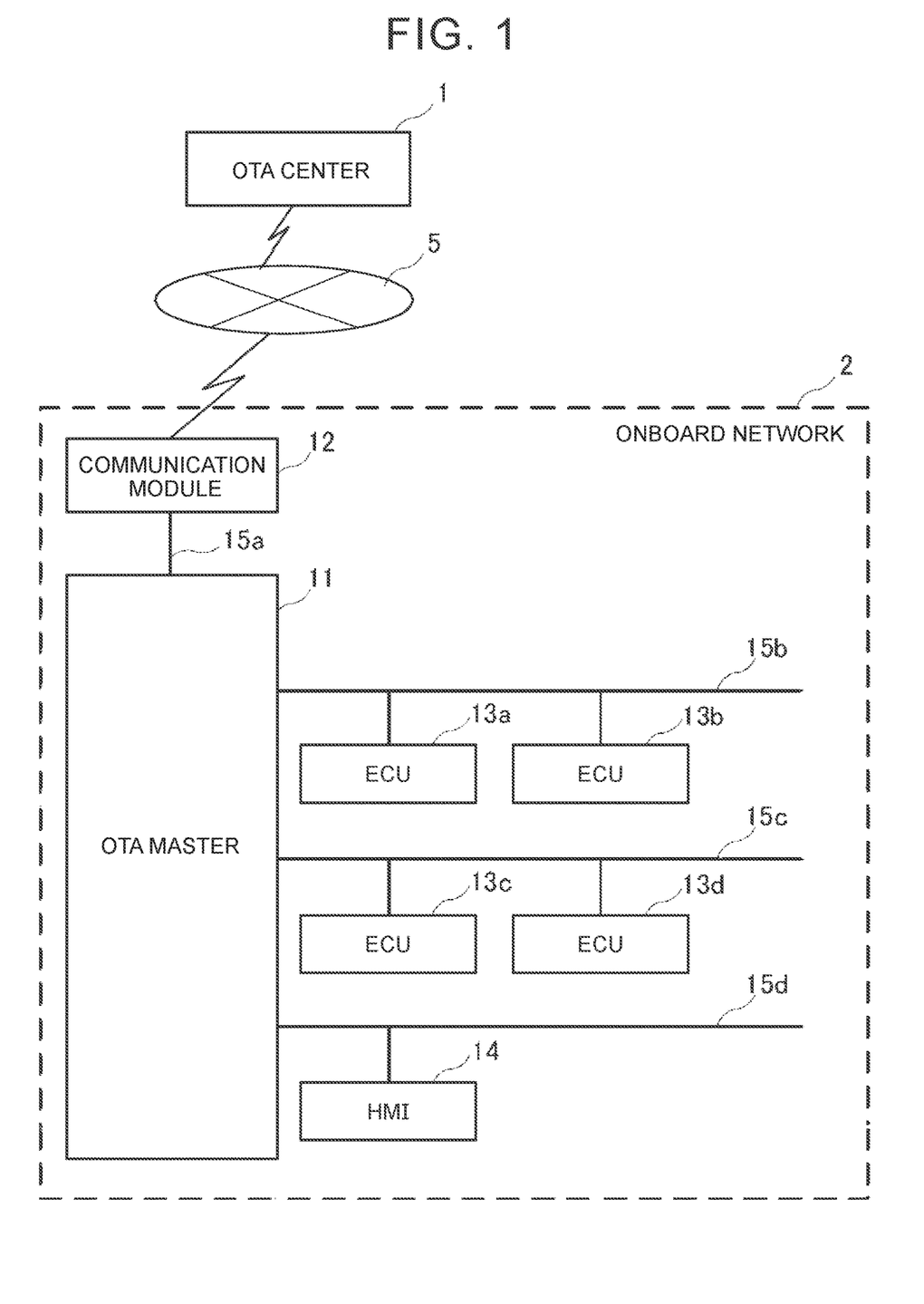
FIG. 1 is a block diagram illustrating an example of an overall configuration of a network system according to a first embodiment.
Figure 2:
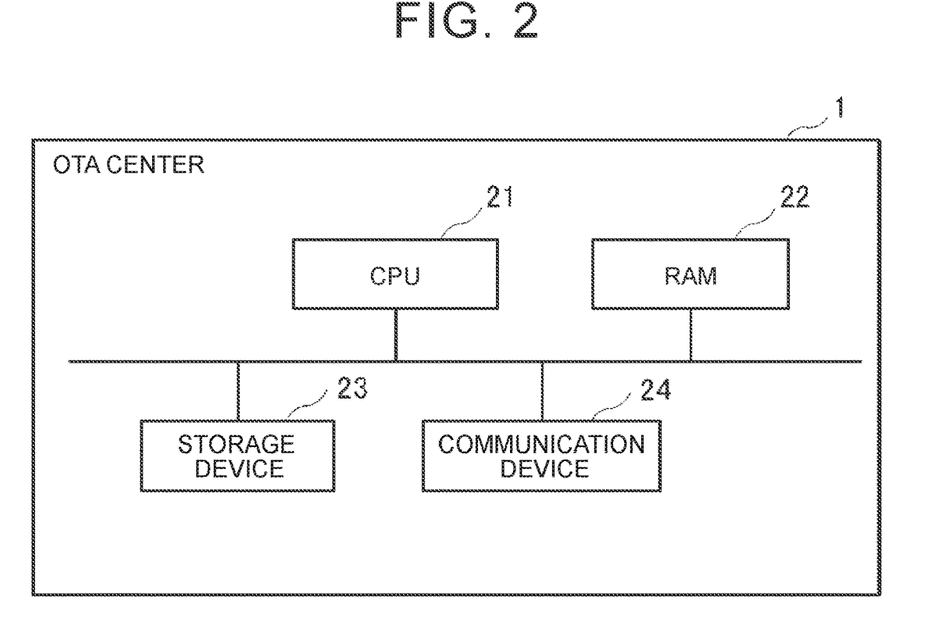
FIG. 2 is a block diagram illustrating an example of a schematic configuration of an OTA center illustrated in FIG. 1.
Figure 3:
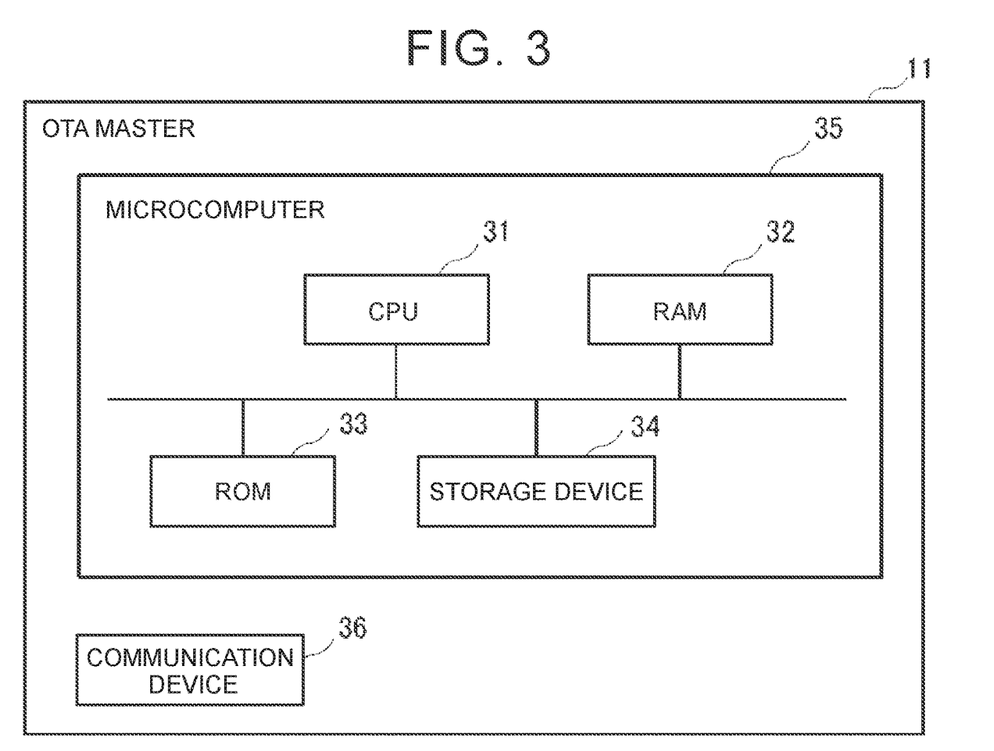
FIG. 3 is a block diagram illustrating an example of a schematic configuration of an OTA master illustrated in FIG. 1.
Figure 4:
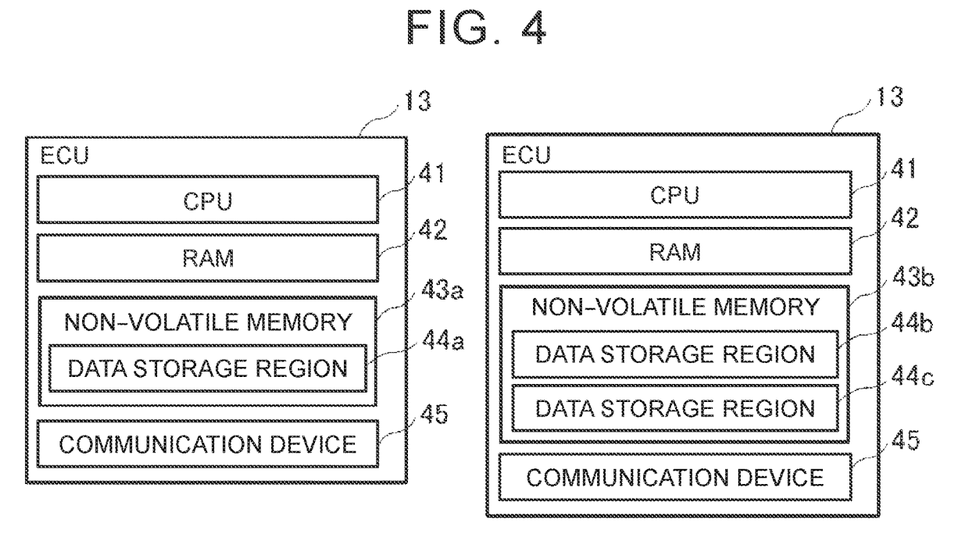
FIG. 4 is a block diagram illustrating examples of schematic configurations of ECUs illustrated in FIG. 1.

FIG. 1 is a block diagram illustrating an example of an overall configuration of a network system according to a first embodiment. FIG. 2 is a block diagram illustrating an example of a schematic configuration of an OTA center illustrated in FIG. 1. FIG. 3 is a block diagram illustrating an example of a schematic configuration of an OTA master illustrated in FIG. 1. FIG. 4 is a block diagram illustrating examples of schematic configurations of ECUs illustrated in FIG. 1.

The network system illustrated in FIG. 1 is a system for updating software of a plurality of ECUs 13a through 13d installed in a vehicle. The network system is provided with an OTA center (e.g., a server, may be referred to simply as "center") 1 and an in-vehicle network 2 installed in the vehicle.

The OTA center 1 is capable of communication with an OTA master 11 installed in the vehicle, wirelessly or the like, via a communication network 5 such as the Internet or the like, and manages updating of software of the ECUs 13a through 13d installed in the vehicle.

As illustrated in FIG. 2, the OTA center 1 is provided with a central processing unit (CPU) 21, random access memory (RAM) 22, a storage device 23, and a communication device 24. The storage device 23 is provided with a readable/writable storage medium such as a hard disk, a solid-state drive (SSD), or the like, and stores programs for executing software update management, information used in update management, and update data for ECUs. The CPU 21 executes programs read from the storage device 23 using the RAM 22 as a working area, thereby executing control processing. The communication device 24 performs communication with the OTA master 11 via the communication network 5.

As illustrated in FIG. 1, The in-vehicle network 2 is provided with the OTA master 11, a communication module 12, the ECUs 13a through 13d, and a human-machine interface (HMI) 14, an example of which is a display device of an automotive navigation system that is capable of accepting input operations. The OTA master 11 is connected to the communication module 12 via a bus 15a, connected to the ECUs 13a and 13b via a bus 15b, connected to the ECUs 13c and 13d via a bus 15c, and connected to the HMI 14 via a bus 15d. The OTA master 11 is capable of wireless communication with the OTA center 1 via the communication module 12. The OTA master 11 controls software updating of, out of the ECUs 13a through 13d, an ECU of which software is the object of updating (may be referred to as "target ECU"), based on update data acquired from the OTA center 1. The communication module 12 is communication equipment that connects the in-vehicle network 2 and the OTA center 1. The ECUs 13a through 13d control operations of the parts of the vehicle. When performing update processing of software of the ECUs 13a through 13d, the HMI 14 is used for performing various types of displays, such as displaying that there is update data, displaying an agreement request screen prompting a user or administrator to agree to software updating, displaying results of updating, and so forth. Note that although four ECUs 13a through 13d are exemplified in FIG. 1, the number of ECUs is not limited.

As illustrated in FIG. 4, the ECUs 13 (13a through 13d) each are provided with a CPU 41, RAM 42, non-volatile memory 43, and a communication device 45. The CPU 41 executes software (programs) read from the non-volatile memory 43 (data storage region 44 (44a, 44b, and 44c)) using the RAM 42 as a working area, and also communicates with other equipment via a bus as necessary, using the communication device 45, thereby realizing the functions of the ECU 13.

Now, there are two types of ECUs 13, one being a single-bank memory ECU (a left block diagram in FIG. 4) of a type that has one data storage region (bank) 44a for storing software, and the other being a double-bank memory ECU (a right block diagram in FIG. 4) of a type that has two data storage regions (banks) 44b and 44c for storing software. There are cases in which the data storage region 44 of the ECU 13 stores, in addition to the software for realizing functions of the ECU, version information and parameter data, a boot program for startup, programs for software updating, and so forth. In a single-bank memory ECU, installing update data in the data storage region 44a and then activating (enabling) the update data affects the software of the ECU. On the other hand, in a double-bank memory ECU, one of two data storage regions (44b, 44c) serves as a storage region that is the object of reading (active bank), and software stored in the storage region that is the object of reading is executed. Update data can be written in the background to the other storage region that is not the object of reading (non-active bank) while programs in the storage region that is the object of reading (active bank) are being executed. When activating in software update processing, the storage region that is the object of reading programs by the CPU 41 is switched, whereby the update version of software can be activated (enabled). In a single-bank memory ECU and a double-bank memory ECU, a state in which activation of software is completed and the ECU can operate under this software can be said to be a state in which this software is implemented in the ECU.

Note that in the present disclosure, double-bank memory ECUs include ECUs having memory of a configuration called "one-bank suspended memory", in which one bank of data storage region that the non-volatile memory has is virtually sectioned into two banks, and while programs of one bank are being executed, programs can be written to the other bank, and also ECUs that have, in addition to non-volatile memory having one bank of data storage region, extended non-volatile memory having one bank of data storage region, and these two banks of non-volatile memory can be used as an active bank and a non-active bank.

As illustrated in FIG. 3, the OTA master 11 is provided with a microcomputer 35 that has a CPU 31, RAM 32, ROM 33, and a storage device 34, and a communication device 36. The CPU 31 executes programs read from the ROM 33 using the RAM 32 as a working area, thereby executing control processing. The communication device 36 performs communication with the communication module 12, the ECUs 13a through 13d, and the HMI 14, via the busses 15a through 15d illustrated in FIG. 1.

Now, software update processing includes a phase of downloading update data from the OTA center 1, a phase of transferring the downloaded update data to the target ECU that is the object of the update and installing the update data to the storage region of the target ECU, and a phase of activating in which the update version of the software installed to the target ECU is enabled.

Downloading is processing of receiving update data transmitted from the OTA center 1, for updating the software of the ECU, and storing the update data in the storage device 34. The download phase includes not only reception of the update data, but also includes control of a series of processing relating to downloading, such as determining whether downloading can be executed, verification of the update data, and so forth. Installing is processing of writing the update version program (update software) to the non-volatile memory of the target ECU that is the object of updating, based on the downloaded update data. The installation phase includes not only execution of installing, but also includes control of a series of processing relating to installing, such as determining whether installation can be executed, transfer of the update data, verification of the update version program, and so forth. Activating is processing of activating (enabling) the installed update version program. The activation phase includes not only execution of activating, but also includes control of a series of processing relating to activating, such as determining whether activation can be executed, verification of execution results, and so forth.

The update data transmitted from the OTA center 1 to the OTA master 11 may contain any of update software for ECUs, compressed data in which update software has been compressed, and divided data in which update software or compressed data has been divided. Also, the update data may contain an identifier (ID) for identifying the target ECU that is the object of updating (ECU ID), and an identifier (ID) for identifying software before updating (ECU software ID). The update data is downloaded as a distribution package, and the distribution package contains update data of one or more ECUs.

When the update data includes the update software itself, the OTA master 11 transfers the update data (i.e., update software) to the target ECU in the installation phase. Also, when the update data includes compressed data, differential data, or divided data of the update software, the OTA master 11 may transfer the update data to the target ECU and the target ECU may generate the update software from the update data, or the OTA master 11 may generate the update software from the update data, and transfer the update software to the target ECU. Now, generating the update software can be performed by decompressing compressed data, or assembling differential data or divided data.

Installation of the update software can be performed at the target ECU, based on an installation request from the OTA master 11. Alternatively, the target ECU, which has received the update data, may autonomously install the update software without receiving any explicit instruction from the OTA master 11.

Activation of the update software can be performed at the target ECU, based on an activation request from the OTA master 11. Alternatively, the target ECU, which has received the update data, may autonomously activate the update software without receiving any explicit instruction from the OTA master 11.

Figure 5:
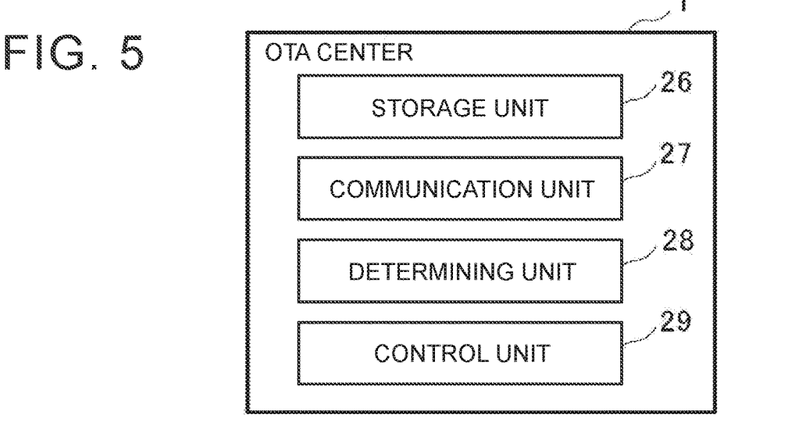
FIG. 5 is a functional block diagram illustrating an example of the OTA center illustrated in FIG. 1.

FIG. 5 is an example of a functional block diagram of the OTA center 1 illustrated in FIG. 1. As illustrated in FIG. 5, the OTA center 1 is provided with a storage unit 26, a communication unit 27, a determining unit 28, and a control unit 29. The communication unit 27, the determining unit 28, and the control unit 29 are realized by the CPU 21 illustrated in FIG. 2 executing programs stored in the storage device 23 using the RAM 22. The storage unit 26 is realized by the storage device 23 illustrated in FIG. 2.

Figure 6:
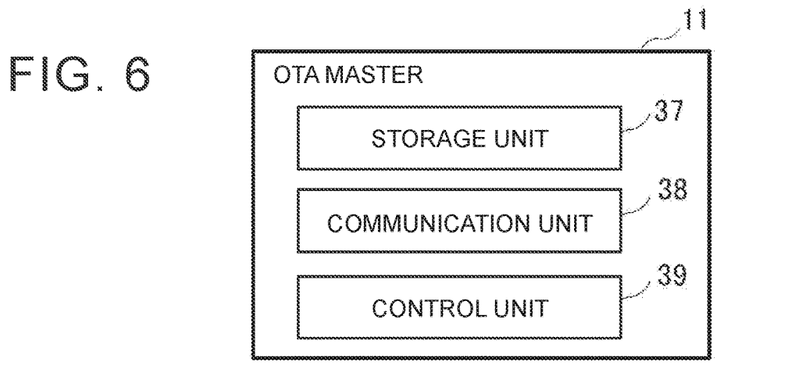
FIG. 6 is a functional block diagram illustrating an example of the OTA master illustrated in FIG. 1.

FIG. 6 is an example of a functional block diagram of the OTA master 11 illustrated in FIG. 1. As illustrated in FIG. 6, the OTA master 11 is provided with a storage unit 37, a communication unit 38, and a control unit 39. The communication unit 38 and the control unit 39 are realized by the CPU 31 illustrated in FIG. 3 executing programs stored in the ROM 33 using the RAM 32. The storage unit 37 is realized by the storage device 34 illustrated in FIG. 3.

Figure 7:
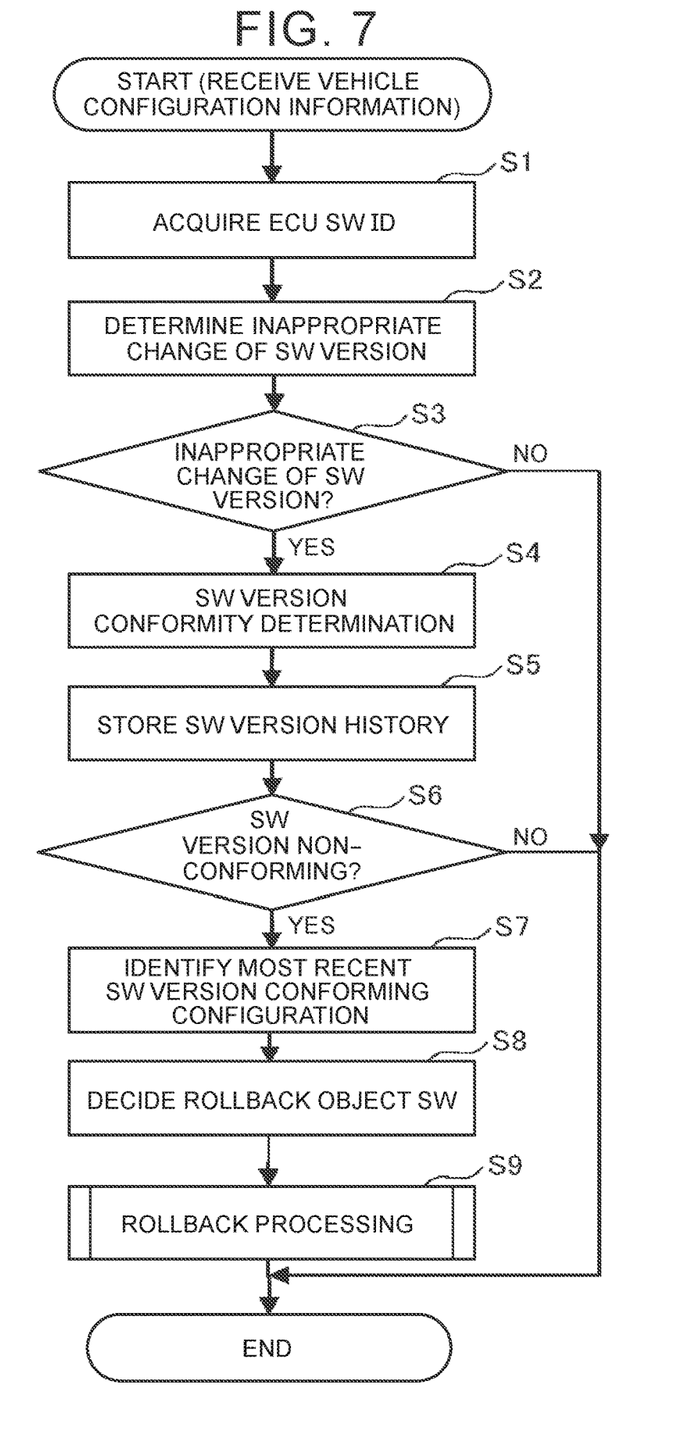
FIG. 7 is a flowchart showing an example of control processing executed by the OTA master according to the first embodiment.

FIG. 7 is a flowchart showing an example of control processing that the OTA center 1 according to the present embodiment carries out. The control processing according to the present embodiment will be described below with reference to the flowchart shown in FIG. 7.

The processing illustrated in FIG. 7 is started by the communication unit 27 receiving vehicle configuration information transmitted from the OTA master 11.

Now, when predetermined conditions are satisfied (typically, detection of the ignition of the vehicle being turned on), the OTA master 11 installed in the vehicle acquires, from each ECU of all of the ECUs of the vehicle, an ECU ID that enables the type of ECU to be identified, and an ECU software ID that enables identification of the type and version of software (may be abbreviated to "SW"). The OTA master 11 then generates vehicle configuration information including the acquired ECU ID and ECU software ID, and a vehicle identification number (VIN) that enables the vehicle to be identified, and transmits the vehicle configuration information to the OTA center 1. According to this processing, each time the ignition is turned on, for example, vehicle configuration information is generated and transmitted to the OTA center 1 by the OTA master 11, and accordingly, the OTA center 1 can comprehend the hardware configuration and the software configuration of the ECUs of each vehicle.

In step S1 in FIG. 7, the control unit 29 acquires the VIN and the ECU software ID (identification information) from the vehicle configuration information received by the communication unit 27. Thereafter, the processing transitions to step S2.

In step S2, the determining unit 28 determines whether the version of software has been inappropriately changed regarding an ECU installed in the vehicle indicated by the VIN acquired in step S1. This will be described in detail below.

The storage unit 26 stores implementation management version information (propriety determination information) indicating the versions of software that the OTA center 1 manages as being implemented in the ECUs of each vehicle (hereinafter may be referred to as "implementation management version"). In other words, the implementation management version information is information indicating the version of software that should be implemented in the ECU (implementation management version). The implementation management version information is information indicating that, in a vehicle with VIN of 1001 (a vehicle in which ECU1 through ECU4 are installed) for example, software that is software for the ECU1 and that is version 2.2 is implemented in the ECU1, software that is software for the ECU2 and that is version 2.4 is implemented in the ECU2, software that is software for the ECU3 and that is version 2.2 is implemented in the ECU3, and software that is software for the ECU4 and that is version 2.5 is implemented in the ECU4, which will be described in detail layer with reference to FIG. 9. The implementation management version information is updated as suitable. For example, when the OTA master 11 performs update control based on the update data of software transmitted from the OTA center 1 and updates the software of an ECU (version upgrade), and the OTA master 11 performs notification of update completed to the OTA center 1, the implementation management version information is updated by the version of software following updating.

In step S2, the determining unit 28 compares the software version indicated by the ECU software ID (identification information) acquired in step S1 with the implementation management version indicated by the implementation management version information stored in the storage unit 26, for each of the ECUs installed in the vehicle that the VIN acquired in step S1 indicates. When the version of the software that the ECU software ID indicates and the implementation management version indicated in the implementation management version information do not agree, the determining unit 28 then determines that the version of the software has been changed inappropriately. Now, when an ECU installed in a vehicle is replaced (parts replacement), the version of the software that the ECU software ID indicates and the implementation management version indicated in the implementation management version information often no longer agree, as described above, and in such a case, the determining unit 28 determines that the version of the software has been changed inappropriately. Thereafter, the processing transitions to step S3.

In step S3, when determination has been made in step S2 that the version of the software has been changed inappropriately (the software version has been inappropriately changed), the control unit 29 advances the processing to step S4, and otherwise, ends the processing of FIG. 7.

In step S4, the determining unit 28 determines the conformity among software version for the ECUs installed in the vehicle indicated by the VIN acquired in step S1 (the appropriateness of version combination). This will be described in detail below.

Figure 8:
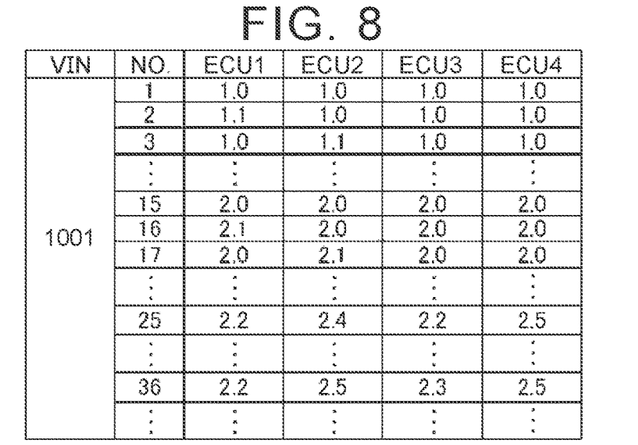
FIG. 8 is a diagram for describing an example of conforming configuration information stored in advance in the OTA center illustrated in FIG. 5.

FIG. 8 is a diagram for describing conforming configuration information defining all conforming (proper) version combinations of software implemented in the ECUs installed in the vehicle. As illustrated in FIG. 8, for example, all conforming (proper) version combinations of software implemented in the ECU1 through ECU4 are defined in the conforming configuration information relating to the vehicle of which the VIN is 1001 (vehicle in which the ECU1 through ECU4 are installed). In other words, combinations of software versions not in the conforming configuration information are non-conforming version combinations, and can be said to be unsuitable version combinations. When the version combination is non-conforming, there is a possibility that the ECUs will not operate properly, and there is a possibility that the vehicle will not operate properly.

In step S4, the determining unit 28 determines, with regard to the ECUs installed in the vehicle indicated by the VIN acquired in step S1, whether the combination of versions of software indicated by the ECU software ID acquired in step S1 matches one of the software version combinations indicated in the conforming configuration information stored in the storage unit 26 in advance. When determining to match one of the combinations, the determining unit 28 determines that there is conformity among the software versions, and when determining to not match any of the combinations, determines that there is no conformity among the software versions (i.e., determines to be non-conforming). Thereafter, the processing transitions to step S5.

In step S5, the control unit 29 writes history of the versions of software indicated by the ECU software IDs acquired in step S1, to software version history information stored in the storage unit 26 (hereinafter, may be referred to simply as "history information"). This will be described in detail below.

Figure 9:
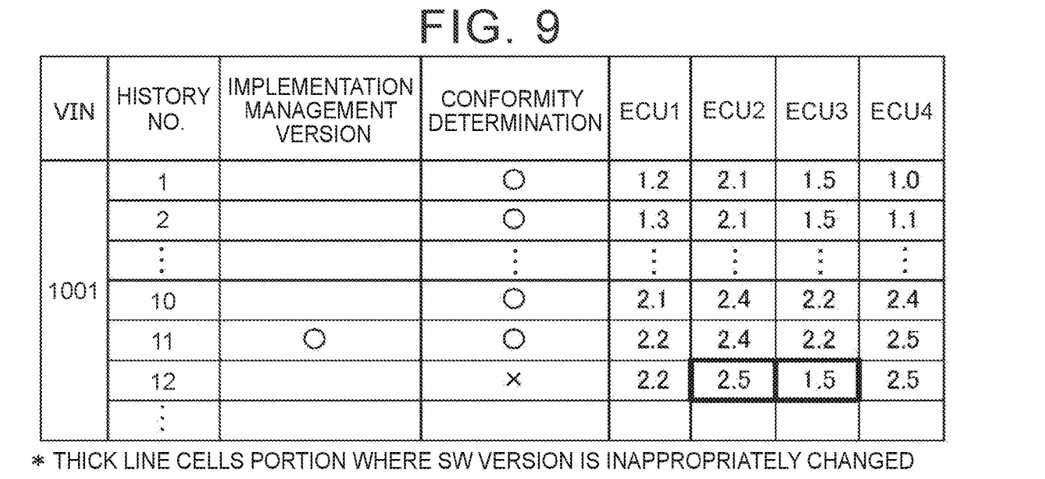
FIG. 9 is a diagram for describing an example of history information stored in the OTA center illustrated in FIG. 5.

FIG. 9 is a diagram for describing the software version history information. As illustrated in FIG. 9, the history of software versions implemented in ECU1 through ECU4 is written to the history information relating to the vehicle with the VIN of 1001 (the vehicle in which the ECU1 through ECU4 are installed), for example.

In step S5, the control unit 29 writes the versions of software indicated by the ECU software IDs acquired in step S1 (SW version 2.2 of ECU1, SW version 2.5 of ECU2, SW version 1.5 of ECU3, and SW version 2.5 of ECU4), as history No. 12 in the history information in FIG. 9, for example.

Also, when determining in step S4 that there is no conformity among the software versions, the control unit 29 adds information (e.g., information by a flag) indicating that there is no conformity in the history indicated by the history information (non-conforming) in step S5. In the example in FIG. 9, the combination of versions of software in history No. 12 does not exist in the conforming configuration information in FIG. 8 and accordingly is non-conforming, and thus information indicating non-conformity (a cross mark) is added to the "conformity determination" column for history No. 12. Also, when determining in step S4 that there is conformity among the software versions, the control unit 29 adds information indicating that there is conformity in the history indicated by the history information in step S5. In the example in FIG. 9, the combination of versions of software in history Nos. 1 to 11 exist in the conforming configuration information in FIG. 8 and accordingly are conforming, and thus information indicating conformity (a circle mark) is added to the "conformity determination" column for history Nos. 1 to 11.

Figure 10:
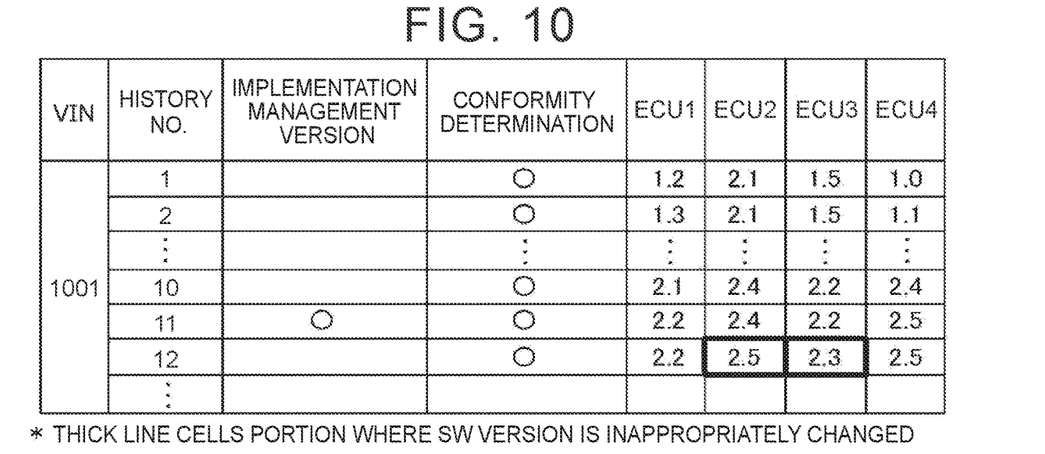
FIG. 10 is a diagram for describing an example of history information stored in the OTA center illustrated in FIG. 5.

FIG. 10 illustrates a case in which the software version of ECU3 in history No. 12 is "2.3", in comparison with the history information in FIG. 9. In the case in FIG. 10, the combination of versions of software in history No. 12 matches a version combination of software indicated by No. 36 in the conforming configuration information shown in FIG. 8, and accordingly the version combination is conforming. Thus, information (a circle mark) indicating a combination of versions with conformity (a proper combination of versions) is added to the "conformity determination" column for history No. 12 in the example in FIG. 10.

Note that in the present embodiment, the control unit 29 adds (includes) implementation management version information indicating the version of software managed as being implemented in the ECUs (implementation management version) to the history information, and updates the implementation management version information as suitable. In the examples in FIGS. 9 and 10, information indicating implementation management versions (circle mark) is added to the version combination of software of history No. 11 (versions of software of each ECU), thereby adding the implementation management version information to the history information. According to this arrangement, the implementation management version information used in processing of the SW version inappropriate change determination in step S2 is stored in the storage unit 26.

In step S6, the control unit 29 advances the processing to step S7 when determining in step S4 that there is no conformity among software versions (i.e., non-conforming), and ends the processing of FIG. 7 when determining that there is conformity in step S4. Note that when determining that there is conformity in step S4 and ending the processing of FIG. 7, the control unit 29 sets the version combination of software that has been determined to have conformity in the implementation management version, and updates the same implementation management version information. In the example in FIG. 10, the information (circle mark) added to the version combination of software for history No. 11 indicating that the version combination is implementation management version will be deleted, and this information (circle mark) will be updated to a state of being added to the version combination of software for history No. 12.

In step S7, the control unit 29 uses the history information to identify the most recent version conforming configuration of software. In the example in FIG. 9, the control unit 29 identifies the version combination of software of history No. 11 as being the most recent version conforming configuration of software. Thereafter, the processing transitions to step S8.

In step S8, the control unit 29 identifies software to be the object of executing rollback processing (restoration processing), in which the version of software is returned so that the version combination of software implemented in the ECU returns to the most recent version conforming configuration of software identified in step S7. In the example in FIG. 9, the control unit 29 identifies the software of the ECU2 and the ECU3 to be software that is the object of executing rollback processing (restoration processing). Thereafter, the processing transitions to step S9.

In step S9, the control unit 29 performs rollback processing to return the version of the software implemented in the ECU to a previous version.

Figure 11:
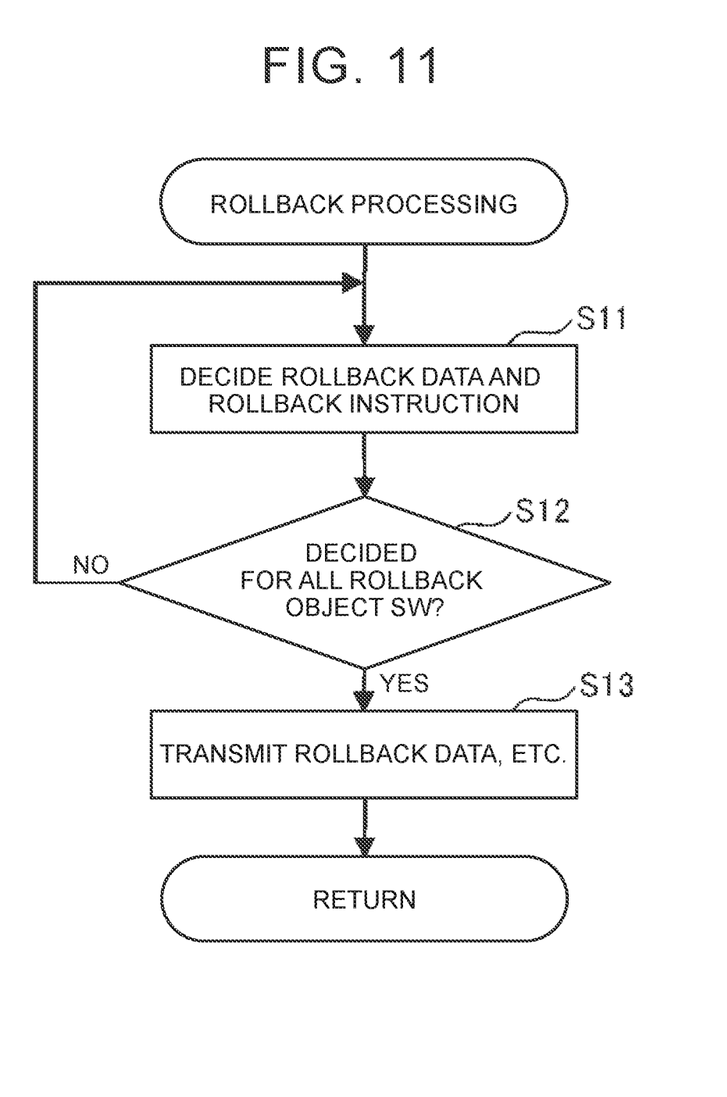
FIG. 11 is a flowchart showing an example of rollback processing shown in FIG. 7.

FIG. 11 is a flowchart showing an example of the rollback processing in step S9. In step S11 in FIG. 11, the control unit 29 decides data for performing version rollback (rollback data) and a rollback instruction, for one of the software identified in step S8 to be the object of executing rollback processing, so as to return to the most recent version conforming configuration of software identified in step S7. Thereafter, the processing transitions to step S12.

In step S12, the control unit 29 determines whether the decision of step S11 has been made for all software that has been identified in step S8 as being the object of rollback. When the determination in step S12 is YES, the processing transitions to step S13, and when this determination is NO, the processing returns to step S11. Accordingly, rollback (restoration) of all versions of software that have been identified as being the object of rollback in step S8 is performed.

In step S13, the control unit 29 transmits the rollback data and the rollback instruction decided in step S11 to the OTA master 11 by the communication unit 27. Thereafter, the rollback processing of FIG. 11 ends, and the processing of FIG. 7 ends as well.

Note that upon the rollback processing of step S9 in FIG. 7 ending and rollback of the version of software that is the object of the rollback being completed, the OTA master 11 transmits a rollback completion notification to the OTA center 1. Upon receiving the rollback completion notification, the OTA center 1 (control unit 29) writes the most recent version conforming configuration of software identified in step S7 (i.e., the version combination of software following the rollback) to the history information as the newest history. At this time, the OTA center 1 (control unit 29) adds information indicating that there is version conformity, to the newest history that has been written. The OTA center 1 (control unit 29) also updates the implementation management version information so that the version combination of software indicated by the newest history that has been written is the implementation management version. In the example in FIG. 9, information that has the same content as that as in history No. 11 will be written in history information as the newest history No. 13, and the circle mark in the column of "implementation management version" for history No. 11 will be deleted.

Second Embodiment

Figure 12:
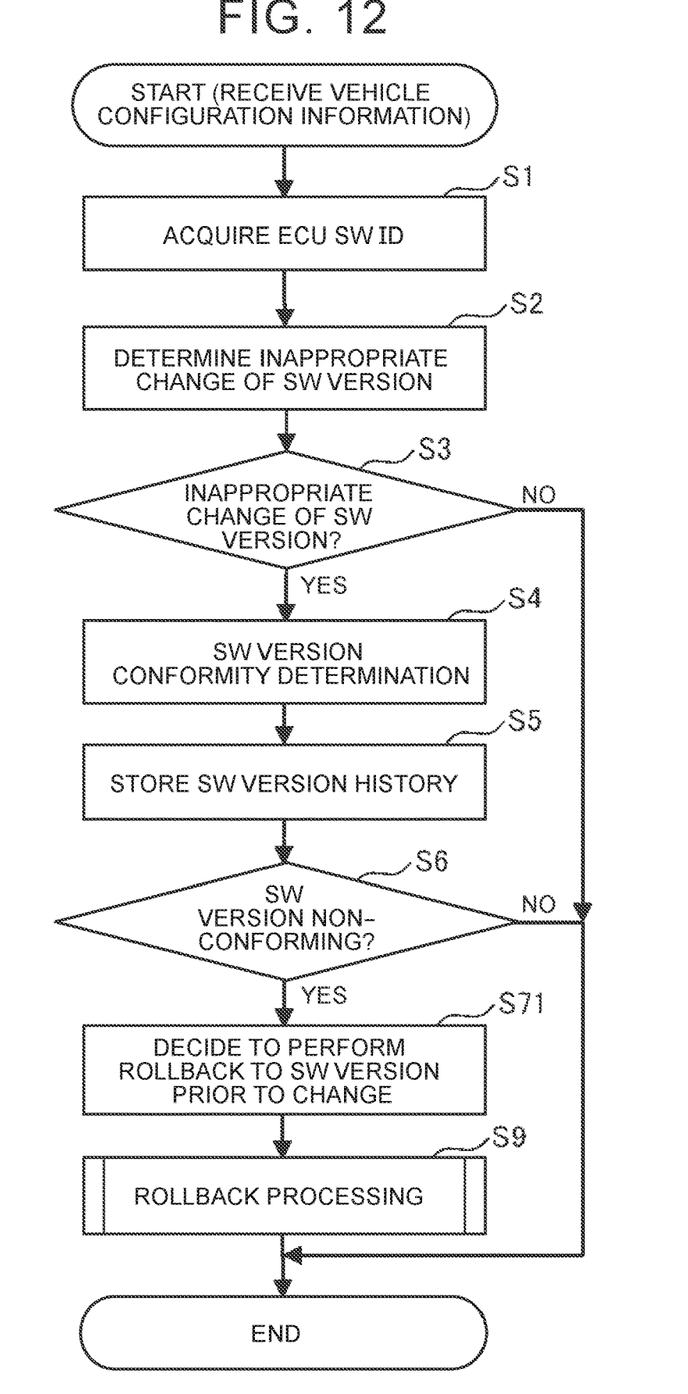
FIG. 12 is a flowchart showing an example of control processing executed by an OTA master according to a second embodiment.

FIG. 12 is a flowchart showing an example of control processing that the OTA center 1 according to a second embodiment carries out. In the flowchart in FIG. 12, the processing of steps S7 and S8 in the flowchart in FIG. 7 according to the first embodiment is replaced by processing of step S71. In the second embodiment, when the software versions are non-conforming (when YES in step S6), processing is performed to return to the implementation management version that the implementation management version information indicates (the versions of software that the OTA center 1 manages as being implemented in the ECUs), rather than performing processing to identify the most recent version conforming configuration of software and return to this version configuration as in the first embodiment. Note that in the following, portions that differ from the processing of the first embodiment will be mainly described.

When a determination of YES is made in step S6 in FIG. 12, in step S71, the control unit 29 decides to perform rollback to the version of software prior to the inappropriate change, for the ECUs installed in the vehicle indicated by the VIN acquired in step S1. Specifically, the control unit 29 references the implementation management version indicated by the implementation management version information stored in the storage unit 26, and decides to perform rollback (restoration) of the software versions to the implementation management version, with regard to the ECUs installed in the vehicle indicated by the VIN acquired in step S1. In the example in FIG. 9, the control unit 29 decides to perform rollback to the version combination of software in history No. 11 that is the implementation management version. Thereafter, the processing transitions to step S9, the versions of software that are the object of rollback are rolled back (restored), and thus are rolled back to the version combination of software in history No. 11 that is the implementation management version.

As described above with reference to FIGS. 7, 12, and others, the OTA center 1 according to the first and the second embodiments can, when the versions of software of the ECUs switch inappropriately due to replacing ECUs (parts replacement), restore the inappropriately-switched ECU software to the implementation management version. Accordingly, the versions of software can be maintained the same before and following replacing ECUs (parts replacement), and can be returned to appropriate versions of software following replacing ECUs.

Now, when the ECUs following parts replacement are double-bank memory ECUs such as described with reference to the right block diagram in FIG. 4, what sort of software (software version) is stored in the data storage region (non-active bank) that is not the object of reading software is unknown (alternatively, there are cases in which no software is stored in the non-active bank). Accordingly, even when the ECUs following parts replacement are double-bank memory ECUs, restoration to the implementation management version under control of the OTA center 1 needs to be performed in the same way as described above.

Also, as described above with reference to FIGS. 7, 12, and others, the OTA center 1 according to the first and the second embodiments can acquire ECU software IDs from the OTA master 11, and generates and manages version history information for software of the ECUs, and can restore the software versions of ECUs that have inappropriately switched, to implementation management versions using the history information thereof. Accordingly, the software versions can be restored using history information, and can be restored to software versions in the history (basically software versions that the user has agreed to).

Also, as described above with reference to FIG. 7 and others, when the software versions of ECUs are inappropriately switched, and when determination is made that versions of software implemented in the ECUs installed in the vehicle are non-conforming (are not an appropriate combination), the OTA center 1 according to the first embodiment can restore to the most recent conforming configuration of software versions using history information. This is ideal in that the conforming configuration of software versions can be restored with surety, and can be restored to the newest conforming configuration. On the other hand, when the software versions of ECUs are inappropriately switched, and when determination is made that versions of software implemented in the ECUs installed in the vehicle are conforming (are an appropriate combination), the OTA center 1 according to the first embodiment does not perform processing to restore the software versions, since no problem will occur due to non-conforming software versions. Thus, processing load can be reduced. In this way, a control configuration may be made in which, even when determination is made that versions of software implemented in the ECUs are conforming (are an appropriate combination), restoration to the most recent conforming configuration of software versions is performed using history information. According to this control, restoration can be made to the software versions in history (software versions that the user has agreed to).

Also, as described above with reference to FIG. 12, when the software versions of ECUs are inappropriately switched, the OTA center 1 according to the second embodiment can directly restore the versions of software of the ECUs to the implementation management versions indicated in the implementation management version information. Thus, software versions can be restored to a conforming configuration with concise processing.

Note that in the second embodiment described above (see FIG. 12), a control configuration may be made in which processing for performing conforming determination of software versions (steps S4 and S6) is not executed. That is to say, when an inappropriate change to software versions is detected (see thick-line cells in FIGS. 9 and 10) processing may be performed to restore the software versions to the implementation management versions, regardless of whether there is conformity among the software versions. Now, the implementation management versions normally have conformity among the software versions, and accordingly the processing load can be reduced by such concise processing.

Also, description has been made above in the first and the second embodiments regarding an example in which implantation management version information indicating the implantation management version is included in (added to) the history information and stored (see FIGS. 9 and 10). However, the implantation management version information may be stored separately from the history information.

Also, the functions of the OTA center 1 exemplified in the above-described embodiments can be realized as a management method executed by a computer having a processor (CPU), memory, and a communication device, or a management program to be executed by the computer, and a computer-readable non-transitory storage medium storing the management program. In the same way, the functions of the OTA master 11 exemplified in the above-described embodiments can be realized as a control method executed by an installed computer having a processor (CPU), memory, and a communication device, or a control program to be executed by the installed computer, and a computer-readable non-transitory storage medium storing the control program.

The technology according to the present disclosure can be used in a network system to update programs of electronic control units (ECUs).

What is claimed is:

1. A center configured to communicate, via a network, with an over-the-air (OTA) master configured to control software updating of a plurality of electronic control units (ECUs) installed in a vehicle, the center comprising a processor configured to:

perform a propriety determination determining whether a version of software implemented in each of the ECUs is an implementation management version that is a version of software to be implemented;

use identification information and compatible configuration information to determine whether a newest combination of software versions indicated by the identification information is appropriate, the identification information indicating the version of software implemented in each of the ECUs, and the compatible configuration information defining an appropriate combination of versions of software implemented in each of the ECUs; and transmit an instruction to the vehicle to roll back the software of at least one of the ECUs when the processor determines that the version of the software of the at least one of the ECUs is not the implementation management version and determines that the newest combination is not appropriate, wherein the processor is configured to not transmit the instruction to the vehicle to roll back the software of the at least one of the ECUs when the processor determines that the version of the software of the at least one of the ECUs is not the implementation management version and determines that the newest combination is appropriate.

2. The center according to claim 1, wherein:

the processor is configured to generate history information indicating history of implemented software versions for the ECUs, based on the identification information;

the history information is stored in a storage device; and the processor is configured to perform the propriety determination using the history information.

3. The center according to claim 1, wherein the identification information includes identification information indicating a version of software implemented in at least one of the ECUs installed in the vehicle due to parts replacement.

4. A management method executed by a computer including a processor and that is configured to communicate, via a network, with an over-the-air (OTA) master configured to control software updating of a plurality of electronic control units (ECUs) installed in a vehicle, the management method comprising:

performing a propriety determination determining whether a version of software implemented in each of the ECUs is an implementation management version that is a version of software to be implemented;

using identification information and compatible configuration information to determine whether a newest combination of software versions indicated by the identification information is appropriate, the identification information indicating the version of software implemented in each of the ECUs, and the compatible configuration information defining an appropriate combination of versions of software implemented in each of the ECUs; and transmitting an instruction to the vehicle to roll back the software of at least one of the ECUs when the processor determines that the version of the software of the at least one of the ECUs is not the implementation management version and determines that the newest combination is not appropriate, wherein the instruction to roll back the software of the at least one of the ECUs is not transmitted to the vehicle when the processor determines that the version of the software of the at least one of the ECUs is not the implementation management version and determines that the newest combination is appropriate.

5. A non-transitory storage medium storing a management program that is executable by a computer including a processor and that is communicable, via a network, with an over-the-air (OTA) master that controls software updating of a plurality of electronic control units (ECUs) installed in a vehicle, and that causes the computer to perform functions comprising:

performing a propriety determination determining whether a version of software implemented in each of the ECUs is an implementation management version that is a version of software to be implemented;

using identification information and compatible configuration information to determine whether a newest combination of software versions indicated by the identification information is appropriate, the identification information indicating the version of software implemented in each of the ECUs, and the compatible configuration information defining an appropriate combination of versions of software implemented in each of the ECUs; and transmitting an instruction to the vehicle to roll back the software of at least one of the ECUs when the processor determines that the version of the software of the at least one of the ECUs is not the implementation management version and determines that the newest combination is not appropriate, wherein the instruction to roll back the software of the at least one of the ECUs is not transmitted to the vehicle when the processor determines that the version of the software of the at least one of the ECUs is not the implementation management version and determines that the newest combination is appropriate.

\* \* \* \* \*